Sept. 23, 1930.  A. G. RAYBURN  1,776,479
MOTOR DRIVEN VEHICLE
Filed Sept. 26, 1925  3 Sheets-Sheet 3

Inventor
Alden G. Rayburn
By William A. Strauch
Attorney

Patented Sept. 23, 1930

1,776,479

UNITED STATES PATENT OFFICE

ALDEN G. RAYBURN, OF SAUSALITO, CALIFORNIA, ASSIGNOR TO EMORY WINSHIP, OF MACON, GEORGIA

MOTOR-DRIVEN VEHICLE

Application filed September 26, 1925. Serial No. 58,805.

The present invention relates to motor driven vehicles.

More particularly the invention relates to improved drives for rail cars, locomotives, and like vehicles in which the body of the vehicle is supported from drive trucks in a manner permitting a limited universal relative movement of the trucks and body. Various forms of drive mechanisms have been heretofore proposed for vehicles of this character in which the driving motor or motors have been mounted in the car body, but these prior proposed constructions have not provided satisfactory compensating means in the drive connections between the motor and trucks, for the relative universal motion of the trucks and the car body under service conditions. As a result, where direct gearing has been used between the motor trucks, the relative movement of the trucks and body introduce shocks in the gearing, and where vertical drive shafts are utilized undesirable turning reactions tending to throw the trucks off the track are developed. To eliminate these undesirable features of direct gear connections, flexible drive connections between the driving motor and truck have been proposed in which angular splined or telescoping propeller shafts lead from the driving connections or gearing in the car body to the driving mechanism of the trucks. Because of the motion in the spline connections due to the universal relative movement of the trucks and body, and the relatively great powers which must be transmitted through the angular splined connections, this type of drive rapidly deteriorates, the life thereof is short, and the maintenance cost is high. To overcome the difficulty introduced due to the angularity and spline movement of the driving or propeller shafts, various arrangements for mounting independent motors on each truck have been proposed. While these arrangements have been found to be operative for electric motor and internal combustion engine drives of smaller powers, when an effort is made to provide motors for the relatively heavier powers it is found that there is not sufficient room for the mounting of the larger motors on the trucks and at the same time to maintain a reasonable height of the vehicle body from the ground or track level. Where relatively large electrical drive or internal combustion motors are to be utilized such for example as are utilized in locomotives it is impossible to mount the motors on the driving trucks.

Accordingly an object of the present invention is to provide a drive for rail cars, locomotives and like vehicles in which angular drive shafts are eliminated while at the same time provision is made for a universal movement of the trucks with relation to the car body without introducing shocks or undesirable turning reactions in the trucks or driving mechanism under service conditions.

A rail car or locomotive must exert substantially its maximum tractive effort at start and at low speeds, to overcome the inertia and to accelerate its movement and to accelerate the movement of trailers or a train which may be drawn thereby. In Diesel engines and other types of internal combustion engines, the torque of the engine is substantially a function of the speed of the engine, the engine developing its maximum torque at high speed. In order that Diesel or internal combustion engines may be used in a locomotive or rail car, a variable speed transmission must be interposed between the engine and the drive trucks, so that in starting the traction wheels will rotate at a low speed while the engine is developing its maximum torque.

A further object of the invention is to provide a locomotive or rail car driven by a relatively high powered internal combustion engine in which suitable arrangements for varying the speed of the locomotive are provided independently of speed variations of the driving motor.

Another object of the invention is to provide divided driving arrangements whereby relatively smaller powered variable speed transmissions may be interposed between the engine and the driving trucks together with novel reversing arrangements especially adapted for use with hydraulic transmissions.

Still further objects of the invention will appear in the following detailed description thereof and are such as may be attained by a utilization of the various combinations, subcombinations and principles hereinafter set forth.

As shown in the drawings:

Figure 3 is a sectional side elevation taken through the center of the left drive truck.

Figure 1:
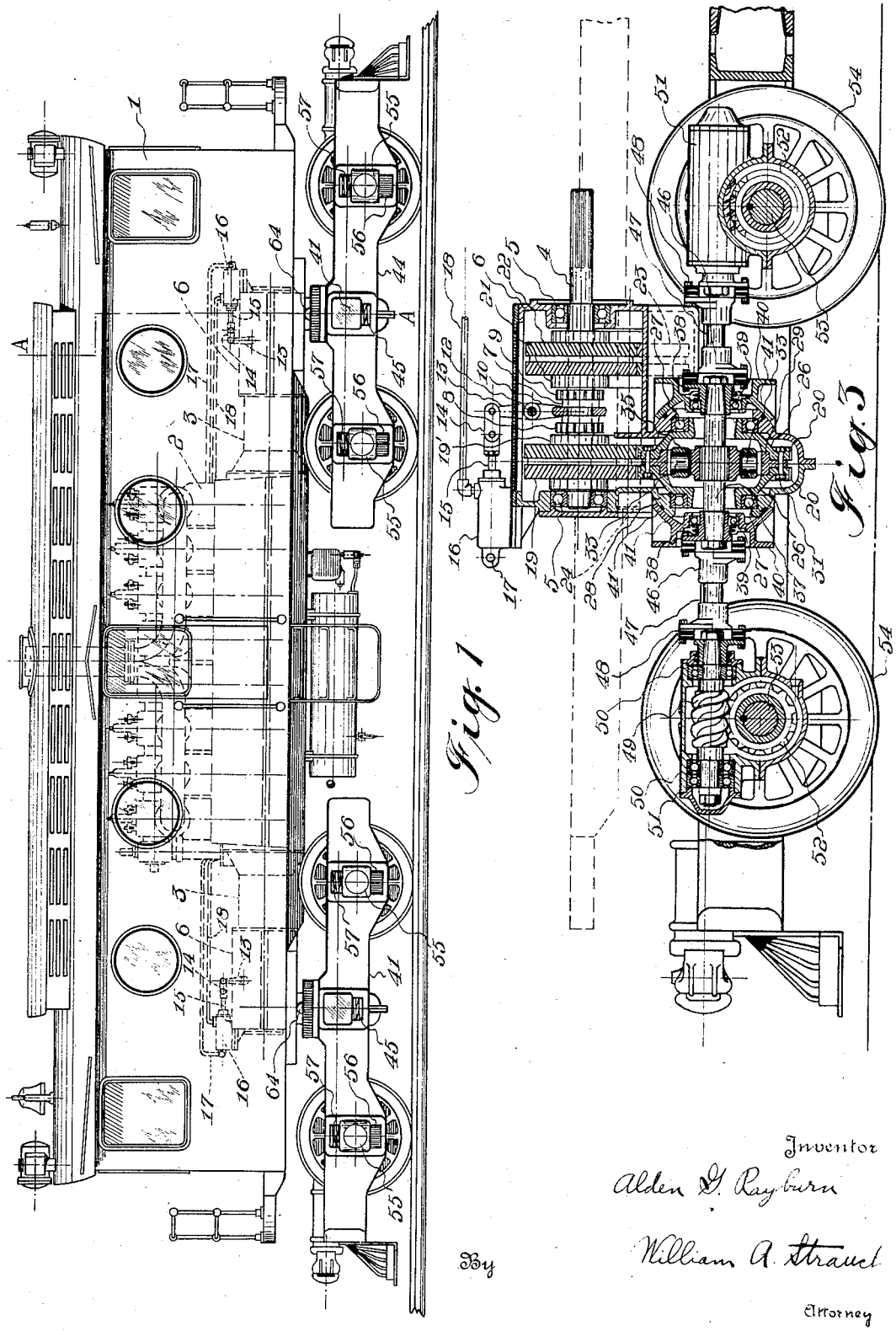
Figure 1 is a side elevation of a preferred arrangement of the invention.

The locomotive is provided with a body 1 which may be of any desired construction and in which a motor 2 is suitably supported from the body framework. While the motor is shown as an internal combustion or Diesel engine it is to be understood that any well known form of drive motor such for example as an electric motor may be utilized. The motor 2 is preferably located midway between the drive trucks of the locomotive and when an internal combustion motor is utilized a variable speed hydraulic transmission such as is disclosed in copending application Serial Number 58,806 filed September 26, 1925, or a suitable mechanical variable speed transmission, diagrammatically indicated at 3 is preferably driven from each end of the engine or motor drive shaft. When an electric motor is utilized as in a Diesel electric drive, the variable sped transmission may be eliminated. Each transmission 3 is connected to and drives the drive shaft 4 (Figure 3) of a locomotive drive truck. The shaft 4 is supported in suitable ball or anti-friction bearings 5 supported in gear casing 6 which in turn is rigidly secured to and supported from the frame of locomotive body 1. Slidably keyed to each shaft 4 is a reversing clutch member 7 which is provided with the toothed clutching or dogging members 8 and 9. A pair of shifting or trunnions pins 10 are formed integrally with a collar surrounding each member 7 and pivotally connect member 7 to the jaw extensions of a shifting member 11, the upper end of which is rigidly secured to and rotatable with a spindle 12 which in turn has secured thereto and is actuated by a shifting arm 13. The upper ends of the arms 13 are connected by link 14 (Figs. 1 and 3) to actuating piston rods 15 of the fluid pressure operating cylinders 16. The operating cylinders 16 are supplied with operating fluid through pipes 17 and 18 from a common reversing control member (not shown) which may be of any suitable construction. Rotatably supported on each shaft 4 is a forward driving gear 19 which has integrally formed therewith an internally toothed clutching member 19′ adapted to mesh with the toothed member 8 of the clutching member 7 when the locomotive is being driven in a forward direction. Gear 19 meshes with and drives a universally mounted master drive gear 20. Toothed member 9 of the dogging member 7 is adapted to mesh with an internal toothed clutching member 21 rigidly secured to or formed integrally with a reversing drive gear 22 mounted on the shaft 4. Gear 22 meshes with and drives a gear 23 (Fig. 3) which in turn is supported on and drives a countershaft 24 suitably journaled in the casing 6. Secured to and driven by the countershaft 24 is an intermediate gear 25 (Fig. 2) which meshes with and drives the master driving gear 20.

Figure 2:
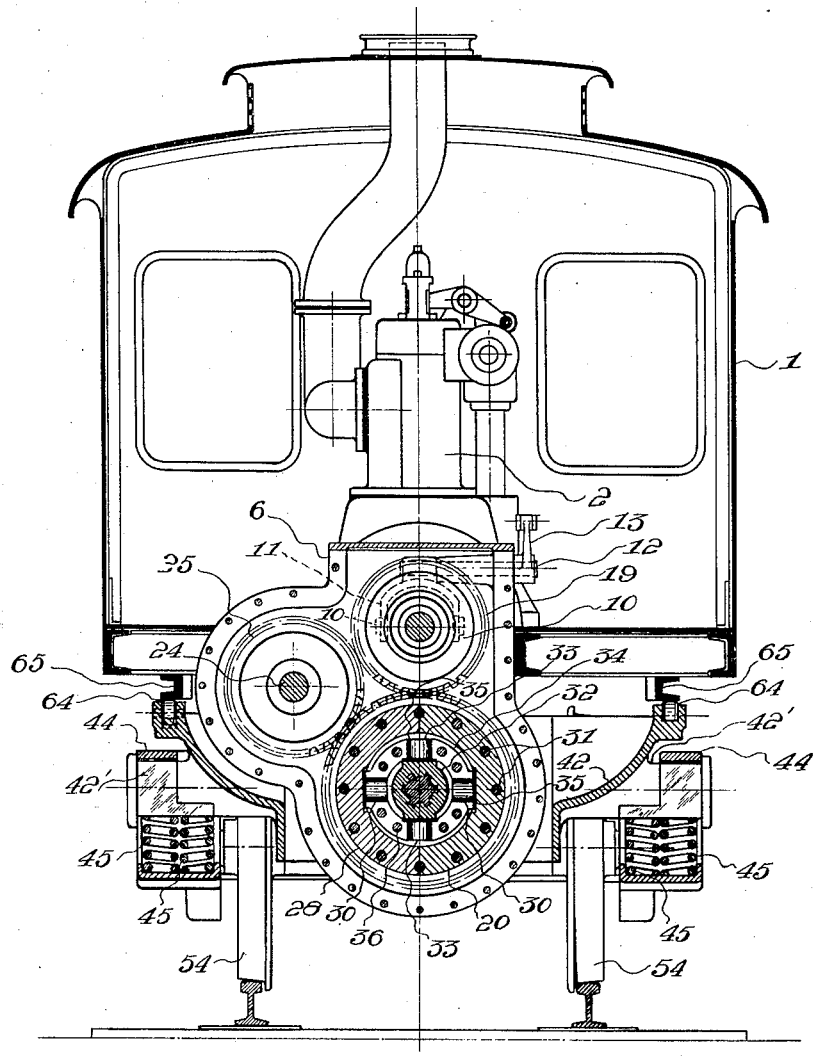
Figure 2 is a sectional end view taken along line AA of Figure 1.

The master gear 20 is built up of toothed half sections 26 which are journaled for rotation in suitable anti-friction bearings 27. Bearings 27 are supported in a spherical-shaped truck pivot and drive connection 28 formed integrally with the casing 6. A trunnion collar member 29 provided with trunnions 30 and formed in halves as shown in Figure 2, is rigidly secured by means of bolts 31 between the half sections 26 of the master gear 20. A central drive member 32 provided with the trunnions 33 is connected to the trunnions 30 by means of a split collar member 34, provided with bushings 35. The collar member 34 is formed in two rings each provided with four half-cylindrical seats for the bushings 35 and the rings are secured together by means of bolts 36 in a manner adapted to receive and maintain the trunnions 30 and 33 on horizontal and vertical axes respectively. Drive member 32 is rigidly secured or keyed to and drives a shaft 37 which is provided at its ends with universal coupling members 38. Sufficient clearance is provided between the trunnions and the collar 34 to permit a sliding motion of the collar on the trunnions sufficient in amount to permit the center of universail motion to remain fixed in operation. The provision of this clearance is an important feature of the invention as by its use a simple universal drive connection with a fixed center is provided, in which the collar is free to compensate for the irregularities of motion due to the angular relation of the shaft 37. The universal coupling members 38 are supported in antifriction journals 39 which in turn are supported in castings 40. Castings 40 are each provided with a central spherical cup member 41 in which the spherical pivot member 28 is seated. To retain lubrication in the spherical pivot joint formed by the castings 40 and the member 28 felt inserts or washers 41′ are preferably provided. Castings 40 are bolted together and secured to truck bolsters 42 which are provided with extensions 42′. Extensions 42′ are guided in slots 43 (Figs. 2 and 4) of the truck side frames 44 and are supported from the side frames on helical springs 45.

Figure 4:
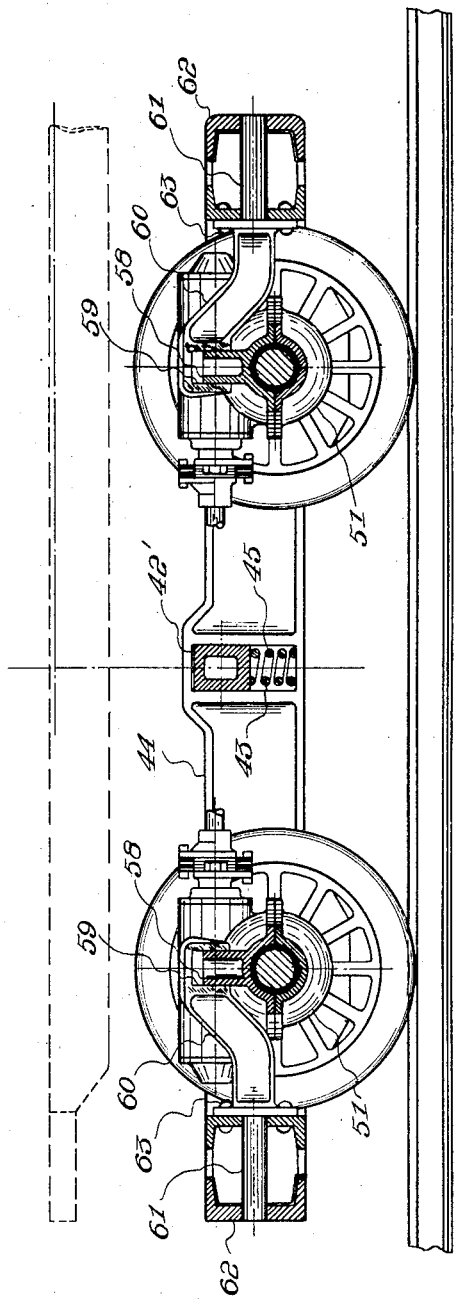
Figure 4 is a sectional side elevation of the left drive truck showing the torque resisting connections.

Coupled to the members 38 of the shaft 37 by means of flexible connections in any well known manner are the coupling members 46 which are secured to and drive the propeller shaft sections 47 (Fig. 3). The outer ends of the propeller shaft sections 47 are connected by means of the universal couplings 48 to the worm drive shafts 49 which are suitably journaled in anti-friction bearings 50 supported in the gear casings or housings 51. Worm shafts 49 mesh with and drive the worm gears 52 which in turn are rigidly secured to and drive the axles 53. Axles 53 are supported in and drive the flanged wheels 54, and supported on extensions of axles 53 are the journal boxes 55 (Fig. 1) which are adapted to slide in slots 56 of the truck side frames. Truck side frames 44 are supported by means of the helical springs 57 from journal boxes 55 in well known manner. To resist the tendency for the gear housings 51 to rotate as the gears 52 are driven by the worm shafts 49, special torque resisting means are provided which comprise the extensions 58 (Fig. 4) of the housings 51 slidably fitted into slots 59 of the torque resisting members 60 (Fig. 4). The torque resisting members 60 are provided with extensions 61 fitted into the end extensions 62 of the truck frames 44 and are riveted to extensions 62 by means of the rivets 63.

The center or neutral point of relative movement of each truck and the body 1 is at the center of the spherical member 28 and the receiving cups 40. To support the weight of the body in its universal movement with relation to the truck rollers 64 (Figs. 1 and 2) are provided in the bolster 42 upon which the body supporting members 65 rest. The shaft 37 will move with the truck in a universal manner with relation to the master gear 20 which is rigidly supported from body 1, and as the axes of trunnions 30, 33 and of shaft 37 intersect at the center of the spherical member 28, the center of universal motion of shaft 37 with respect to the gear 20 is at the neutral point of relative motion of the truck and body.

*Operation*

In operation of the arrangement disclosed the internal combustion engine or Diesel engine shown drives the shafts 4 through the transmissions 3 continuously in the same direction and at a speed which depends upon the engine speed and the setting of the variable speed transmission. As shown in Figure 3, with the control or clutch member 7 in mid position the engine is disconnected from the truck driving gearing for the trucks and the shafts 4 turn over without producing any driving effect. If the locomotive is to be driven forward the shift control member is actuated so that the cylinders 16 will shift the members 7 to move the toothed clutch member 8 into mesh with the clutching member 19' of the forward driving gears 19. The gears 19 will then rotate with the shafts 4 and will drive the gears 20 which in turn drive the shafts 37 through the trunnions 30 and 33. The shafts 37 will move with the trucks, while the gears 20 are supported from and movable with the frame. Rotation of the shaft 37 drives the wheels 54 of each of the trucks through shafts 47 and 49, and through gears 52 in a manner to drive the vehicle in a forward direction. When the direction of the vehicle is to be reversed the shift or reversing control member is actuated to cause the cylinders 16 to shift members 7 until the toothed clutch members 9 mesh with the clutch members 21 of the gears 22. Gear 19 will then be disengaged and the gear 22 will rotate with the shaft 4 driving the shaft 24 through the gear 23. The shaft 24 causes rotation of the gear 25 which in turn reverses the direction of the master gear 20 and drives the shafts 37, 47 and 49 in a direction to reverse the rotation of the driving wheel 54.

With the vehicle running in either direction, as it passes around curves or over elevations or depressions in the tracks the trucks will move with relation to the body about the centers of the universal pivot connections 28 of the castings 6 through which the driving reactions are transmitted to the body. Shafts 37 will move with the truck upon which they are mounted while master gears 20 will be rigidly held in mesh with the gears 19 and 25 and will move with the body. In this way universal motion between the master gears 20 and the shafts 37 will occur about trunnions 30 and 33 with the fixed center of motion at the center of the universal pivot connections 28 of the trucks with the car body. The driving force is accordingly transmitted through a universal joint or connection from the body supported driving means to the truck supported driving means with its center of motion located at the fixed center or neutral point of motion of the trucks with relation to the car body under operating conditions. As a result, the relative motions of the truck and car body have no substantial effect on the driving mechanism. Motion of the side frames of the trucks with relation to the wheels due to the deflection of the springs 57 is provided for in the flexible connections interposed between the shafts 37, 47 and 49, and rotation of the gear housings 51 about the axles 53 due to the driving torque reactions on the worm shafts 49 is prevented by the torque resisting members 60.

It will accordingly be seen that an improved drive connection between a driving motor mounted on a body universally supported from driving trucks is provided without resorting to angular or telescoping shafts and in which the effect of relative universal movements of the body and trucks is eliminated. While a single motor located in the center of the vehicle body has been shown, with the driving force taken from opposite ends of the engine shaft in order that the power may be divided and relatively smaller variable speed transmissions 3 may be utilized, it will be understood that the invention is not limited to this particular method of driving connections.

Accordingly, having described a preferred embodiment of the invention, what is desired to be secured by Letters Patent and claimed as new is:

1. A vehicle comprising a driving truck supported by driving wheels; driving means for said wheels supported on said truck; a body supported from said truck in a manner to permit a limited universal movement thereof with relation to said truck about a neutral point; driving means supported on and movable with said body; and a driving connection between said first and said second mentioned driving means disposed substantially at said neutral point.

2. The combination as set forth in claim 1 in which said driving connection comprises a universal joint with the centers thereof disposed substantially at said neutral point.

3. In combination a drive truck; driving means supported on and movable with said truck; a body; a universal connection between said truck and said body; driving means supported from and movable with said body; and a driving connection between said first and said second mentioned driving means compelling relative movement thereof with relation to each other substantially about a fixed center of relative motion of said truck and said body.

4. A vehicle comprising a body; a motor supported on said body and movable therewith; a master gear driven by said motor and supported on said body; a drive truck supporting said body in a manner to permit a universal motion of said body with relation to said truck; a drive shaft journaled on said truck and movable therewith and a universal connection between said master gear and said drive shaft, the centers of said universal connection and of universal motion of said body being approximately coincident.

5. A vehicle comprising a body, a master gear journaled for rotation on said body with the axis thereof substantially parallel to the longitudinal axis of said body a pair of trunnions driven by said master gear with the axes thereof substantially intersecting the axis of rotation of said master gear at right angles; a pair of trunnions with the axes thereof substantially intersecting said first mentioned trunnion axes and the axis of rotation of said master gear at right angles; a truck supporting said body in a manner to permit a universal relative movement thereof substantially about the point of intersection of said axes; and a drive shaft journaled on said truck with the axis thereof substantially intersecting the point of intersection of said axes at right angles to the axes of said second mentioned trunnions.

6. A vehicle comprising a body; a motor with the drive shaft thereof disposed substantially parallel to the longitudinal axis of said body, a drive truck supporting said body by means of a universal connection; a drive shaft journalled on said truck with the axis thereof substantially parallel to the axis of said motor shaft; and driving gearing between said shaft for transmitting the driving force from said motor to said truck without transmitting shocks due to relative truck and body movements through said gearing to said motor.

7. A driving means for a vehicle that includes a body supported on a truck so that limited universal movement between said body and truck is permitted, including a gear carried by the body, and a shaft carried by the truck and means connecting said shaft and gear in a manner to permit movement of said shaft with respect to said gear in a plurality of directions about the center of the universal movement between said body and truck.

8. The combination defined in claim 7 in which said means includes trunnions carried by said gear and trunnions carried by said shaft and members securing said trunnions together so that the shaft trunnions extend at right angles to said gear trunnions and that angular motion of said shaft about the axes of said trunnions is permitted.

9. A vehicle comprising a body, a truck supporting said body, means connecting said body and truck so that said truck is permitted limited universal movement relative to said body, driven axles capable of vertical movement supporting said truck, a shaft for driving said axles extending therebetween with its axis normally in a horizontal plane, means carried by said body for driving said shaft and mechanism for communicating the power from said means to said shaft, said mechanism permitting relative motion between said shaft and means in a plurality of directions about the center of universal movement between said body and said truck.

10. A vehicle comprising a body having a depending member provided with spherical surfaces, a truck, a bolster yieldingly mounted in said truck, said bolster being provided with a hollow member having spherical surfaces fitting around said first named surfaces, axles arranged on opposite sides of said bolster, and a flexible drive shaft operatively connected to said axles and journaled in said bolster.

11. The combination defined in claim 10 in which the axis of the flexible drive shaft normally lies in a horizontal plane and passes through the center of said spherical surfaces.

12. A vehicle comprising a body, a truck, a bolster yieldable in substantially vertical planes, said body being secured to said bolster in a manner permitting limited relative universal movement between said body and truck, driven axles yieldable in vertical planes supporting said truck, a flexible shaft between said bolster and axles, and means for transmitting the power of a motor supported on said body to said shaft, said last named means including a gear supported in the body and connected to said shaft so that relative motion between said gear and shaft in a plurality of directions about the center of universal movement between body and truck is permitted.

13. A vehicle comprising a body, a truck supporting said body so that limited universal motion between said body and truck about a center is permitted, a motor on the body, driven axles on the truck and means operatively connecting said motor and truck, said means including a gear carried by the body and a shaft carried by the truck, said gear being connected to said shaft so that relative motion between gear and shaft in a plurality of directions about said center is permitted.

14. The combination defined in claim 13 in which the axis of the shaft lies normally in a horizontal plane passing substantially through said center.

15. A vehicle comprising a main frame, drive trucks supporting said frame, means connecting said frame and trucks so that limited universal movement between said trucks and frame is permitted, a motor supported substantially above said frame and between said trucks, a drive shaft extending in opposite directions from said motor toward each of said trucks, a gear arranged with its axis in alignment with each end of said shaft and driven by said shaft, each gear being disposed above the center of universal movement of said trucks, and means operatively connecting each of said gears with said trucks, said last named means permitting relatively free movement of the trucks with respect to said frame.

16. A vehicle comprising a main frame, drive trucks supporting said frame, means connecting said frame and truck so that limited universal movement between said trucks and frame is permitted, a motor supported on said frame and between said trucks, a drive shaft extending in opposite directions from said motor toward each of said trucks, a gear arranged adjacent each end of and driven by said shaft, each gear being disposed vertically above the center of universal movement between each truck and frame, means operatively connecting said shaft and each of said gears for reversely and selectively rotating the gears, and means operatively connecting each of said gears with the driven axles of one of said trucks, said last named means permitting relatively free movement of said trucks with respect to said frame.

17. A vehicle comprising a main frame, drive trucks supporting said frame, means connecting said frame and trucks so that limited universal movement between said trucks and frame is permitted, a motor supported substantially above said frame and between said trucks, a drive shaft extending in opposite directions from said motor toward each of said trucks, a gear disposed above the centre of universal movement of each of said trucks and operatively connected with an end of said shaft, a master gear arranged beneath each of said gears with its center of rotation approximately coincident with the center of universal movement between the truck and frame and a drive shaft extending in opposite directions from said master gear for actuating the axles of said truck, said drive shaft being connected to said master gear by a universal joint the center of which is approximately coincident with said first named center.

18. The combination recited in claim 17 in which the drive shaft for the truck axles extends substantially horizontally and is provided with worms adjacent its ends for driving the axles of said truck.

19. A vehicle comprising a body, a truck, each including a pair of driven axles arranged adjacent each end of said body, means connecting each of said trucks to said body so that limited universal movement of each truck relative to the body is permitted, an internal combustion engine arranged within said body between said trucks, said internal combustion engine including a drive shaft extending in opposite directions from said engine toward said truck, a gear arranged above each of the centers of universal movement between said trucks and body, means operatively connecting said shaft and each of said gears for selectively and variably driving said gears in opposite directions, a master gear supported by said body beneath each of said first named gears and means operatively connecting each of said master gears with the drive axles of the truck, said last named means permitting relatively free movement of each of said trucks with respect to said body.

20. The combination defined in claim 19 in which the last named means comprising a substantially horizontal flexible shaft connected to said master gear by a universal joint whose center is approximately at the center of universal motion between the truck and body.

21. A vehicle comprising a main frame, drive trucks supporting each end of said frame, means connecting said frame and trucks, a motor supported on said frame between said trucks, a drive shaft extending in opposite directions from said motor above and toward each of said trucks, a variable speed power transmission apparatus for each of said trucks driven by said shaft, a master gear for each truck supported thereby, said master gears being separately driven by said variable speed power transmission apparatus, and mechanism for each truck independent of said variable speed power transmission apparatus and supported on said frame above the means that connects each truck thereto for operatively connecting said apparatus and said master gear for reversing the rotation of said master gears and means for controlling each of said last named mechanisms.

22. The combination defined in claim 21 in which each variable speed power transmission apparatus is a fluid transmission device.

23. A vehicle comprising a body, a truck supported by a plurality of pairs of wheels arranged to support each end of said body, each truck being attached to said body so that relatively slight universal movement can occur between each truck and said body, an internal combustion engine supported by said body so that its weight is substantially evenly distributed on said trucks, a variable speed power transmission arranged between said engine and each of said trucks so that the weight thereof is distributed substantially evenly on said trucks, mechanism carried by each truck to drive all of the wheels thereof, and means connecting each power transmission to said mechanism on the truck, said last named means comprising elements that do not substantially restrict the relative motion between said trucks and frame permitted by the connections between said trucks and said frame.

24. The combination defined in claim 23 in which each of said power transmission mechanisms is a fluid transmission.

In testimony whereof I affix my signature.

ALDEN G. RAYBURN.